(12) United States Patent
Vecchione et al.

(10) Patent No.: US 10,384,372 B2
(45) Date of Patent: Aug. 20, 2019

(54) METHOD FOR PRODUCING SHAPED POLYMERIC MICROPARTICLES

(71) Applicant: Fondazione Istituto Italiano di Tecnologia, Genoa (IT)

(72) Inventors: Raffaele Vecchione, Naples (IT); Renato De Alteriis, Naples (IT); Paolo Antonio Netti, Naples (IT)

(73) Assignee: Fondazione Istituto Italiano di Tecnologia, Genoa (IT)

( * ) Notice: Subject to any disclaimer, the term of this patent is extended or adjusted under 35 U.S.C. 154(b) by 213 days.

(21) Appl. No.: 14/782,459

(22) PCT Filed: Apr. 8, 2014

(86) PCT No.: PCT/IB2014/060530
§ 371 (c)(1),
(2) Date: Oct. 5, 2015

(87) PCT Pub. No.: WO2014/167495
PCT Pub. Date: Oct. 16, 2014

(65) Prior Publication Data
US 2016/0039117 A1 Feb. 11, 2016

(30) Foreign Application Priority Data
Apr. 9, 2013 (IT) .............. TO2013A0284

(51) Int. Cl.
*B29B 9/16* (2006.01)
*B29B 9/12* (2006.01)
*B29K 67/00* (2006.01)

(52) U.S. Cl.
CPC .................. *B29B 9/12* (2013.01); *B29B 9/16* (2013.01); *B29B 2009/125* (2013.01); *B29B 2009/166* (2013.01); *B29K 2067/04* (2013.01)

(58) Field of Classification Search
CPC .... A61K 9/14; B29B 9/00; B29B 9/10; B29B 9/12; B29B 2009/125; B29B 2009/166
(Continued)

(56) References Cited

U.S. PATENT DOCUMENTS 3,057,831 A * 10/1962 Holdsworth ............ C08F 14/06
428/402
3,562,042 A * 2/1971 Zilsperger et al. ........................
B29C 65/4895
156/244.27

(Continued)

FOREIGN PATENT DOCUMENTS

WO    2008/031035 A3    3/2008

OTHER PUBLICATIONS

Yin et al., Self-Assembly of Monodispersed Spherical Colloids into . . . with Well-Defined Sizes, Shapes, and Structures, Feb. 2001, Advanced Materials, 13 No. 4, pp. 267-271 (Year: 2001).*

(Continued)

*Primary Examiner* — Matthew J Daniels
*Assistant Examiner* — Andrew D Graham
(74) *Attorney, Agent, or Firm* — MacMillan, Sobanski & Todd, LLC

(57) ABSTRACT

Method for producing shaped polymeric microparticles of non-spherical shape, comprising the steps of: placing one or more microparticles of substantially spherical shape in a respective micro-cavity of a mold having the desired non-spherical shape; subjecting said microparticles to softening by exposure to a solvent or mixture of solvent/non-solvent, in the liquid or vapor state, adapted to plasticize the polymeric material constituting said microparticles, and possibly assisting the solvent plasticization process by heat treatment, not excluding the possibility, in less critical cases in terms of conservation of the microstructure, of carrying out heat (Continued)

treatment exclusively, at a temperature not exceeding 40% of the glass transition temperature of the polymer material; and removing said microparticles from the mold cavities.

7 Claims, 7 Drawing Sheets

(58) Field of Classification Search
USPC .......................................................... 264/322
See application file for complete search history.

(56) References Cited

U.S. PATENT DOCUMENTS

| | | | | |
|---|---|---|---|---|
| 3,773,919 A * | 11/1973 | Boswell et al. | ...... | A61K 9/1647 424/486 |
| 3,945,926 A * | 3/1976 | Kesting | ................. | B01D 69/02 210/500.4 |
| 4,247,498 A * | 1/1981 | Castro | ................... | A01N 25/10 264/28 |
| 4,257,997 A * | 3/1981 | Soehngen | ................ | A61L 2/26 264/145 |
| 4,671,909 A * | 6/1987 | Torobin | ................... | B01J 13/04 166/280.1 |
| 4,865,789 A * | 9/1989 | Castro | ................. | A61K 9/2027 264/122 |
| 4,908,271 A * | 3/1990 | Kasai | .................... | B01J 13/185 428/402.22 |
| 5,372,766 A * | 12/1994 | Roe | ......................... | A61L 15/60 264/126 |
| 5,411,737 A * | 5/1995 | Hsu | ........................ | A01N 25/34 424/405 |
| 5,520,923 A * | 5/1996 | Tjia | ..................... | A61K 38/1875 424/426 |
| 5,686,091 A * | 11/1997 | Leong | ..................... | A61F 2/022 264/41 |
| 5,750,148 A * | 5/1998 | Maruyama | .......... | A61K 9/2866 424/461 |
| 6,187,329 B1 * | 2/2001 | Agrawal | ................... | A61F 2/28 424/424 |
| 6,281,256 B1 * | 8/2001 | Harris | ........................ | C08J 9/18 521/123 |
| 6,342,250 B1 * | 1/2002 | Masters | ............... | A61K 9/7007 424/443 |
| 6,451,240 B1 * | 9/2002 | Sherman | ........... | A61M 37/0015 205/164 |
| 2002/0082543 A1 * | 6/2002 | Park | ..................... | A61B 5/1411 604/21 |
| 2003/0015498 A1 * | 1/2003 | Hirst | .......................... | C08J 7/02 216/89 |
| 2003/0116877 A1 * | 6/2003 | Liao | ...................... | B29C 67/202 264/49 |
| 2003/0143269 A1 * | 7/2003 | Oshlack | ............... | A61K 9/0043 424/468 |
| 2004/0156911 A1 * | 8/2004 | Chattopadhyay | ... | B01D 11/0411 424/489 |
| 2005/0084532 A1 * | 4/2005 | Howdle | ............... | A61K 9/1647 424/486 |
| 2005/0084533 A1 * | 4/2005 | Howdle | ............... | A61K 9/0024 424/486 |
| 2005/0147646 A1 * | 7/2005 | Nilsson | ................ | A61L 27/222 424/426 |
| 2005/0244468 A1 * | 11/2005 | Huang | ................. | A61K 9/0051 424/427 |
| 2007/0009564 A1 * | 1/2007 | McClain | ............. | A61K 9/0024 424/423 |
| 2007/0264481 A1 * | 11/2007 | DeSimone | ........... | A61K 9/5138 428/220 |
| 2008/0036119 A1 * | 2/2008 | Kanazawa | ................ | B29B 9/12 264/494 |
| 2008/0181958 A1 * | 7/2008 | Rothrock | ................ | A61K 9/14 424/489 |
| 2008/0282611 A1 * | 11/2008 | Graham | ............. | C08G 18/4833 47/84 |
| 2008/0299168 A1 * | 12/2008 | Dadey | .................. | A61K 9/0024 424/423 |
| 2008/0317816 A1 * | 12/2008 | Ma | .......................... | A61K 9/146 424/426 |
| 2009/0004262 A1 * | 1/2009 | Shaw | .................... | A61K 9/1623 424/456 |
| 2009/0028910 A1 * | 1/2009 | DeSimone | ............ | A61K 9/0097 424/401 |
| 2009/0081273 A1 * | 3/2009 | McDonald | ......... | A61K 38/1875 424/423 |
| 2009/0098183 A1 * | 4/2009 | Detamore | ............ | C12N 5/0075 424/423 |
| 2009/0136583 A1 * | 5/2009 | Park | ...................... | A61K 9/5031 424/497 |
| 2009/0263460 A1 * | 10/2009 | McDonald | ............ | A61K 9/0024 424/426 |
| 2009/0289029 A1 * | 11/2009 | Vecchione | ............ | B81C 99/009 216/13 |
| 2010/0143487 A1 * | 6/2010 | Masters | ............... | A61K 9/0019 424/499 |
| 2010/0244301 A1 * | 9/2010 | Ederer | ................. | B29C 71/0009 264/45.6 |
| 2010/0247663 A1 * | 9/2010 | Day | ......................... | A61K 9/19 424/497 |
| 2010/0291388 A1 * | 11/2010 | Alvarez | ..................... | B29B 9/06 428/407 |
| 2010/0311638 A1 * | 12/2010 | Tiege | ........................ | B29B 9/16 514/1.1 |
| 2010/0316591 A1 * | 12/2010 | Cotton | .................. | A61K 31/765 424/78.37 |
| 2011/0172141 A1 * | 7/2011 | Naylor | .................. | A61K 9/1647 514/1.1 |
| 2011/0182805 A1 * | 7/2011 | DeSimone | ............ | A61K 9/0097 424/1.11 |
| 2011/0237748 A1 * | 9/2011 | Podobinski | ................ | A61J 1/00 525/56 |
| 2011/0245456 A1 * | 10/2011 | Kim | ........................ | B29B 9/12 528/361 |
| 2012/0052581 A1 * | 3/2012 | DeRosa | ...................... | C08J 7/02 435/396 |
| 2012/0071575 A1 * | 3/2012 | DeRosa | ...................... | C08J 7/02 521/88 |
| 2012/0076860 A1 * | 3/2012 | Trout | ....................... | A61K 9/14 424/489 |
| 2012/0146255 A1 * | 6/2012 | Maschke | ............... | A61K 9/1635 264/210.1 |
| 2012/0321536 A1 * | 12/2012 | Kokini | .................. | B29C 65/4895 422/502 |
| 2013/0147074 A1 * | 6/2013 | Hielscher | .................. | B29B 9/16 264/13 |
| 2013/0177598 A1 * | 7/2013 | Desimone | ................ | A61K 9/19 424/400 |
| 2014/0197564 A1 * | 7/2014 | Tanaka | ..................... | B29B 9/04 264/140 |
| 2014/0242180 A1 * | 8/2014 | Lavik | ..................... | A61K 38/06 424/499 |
| 2015/0056294 A1 * | 2/2015 | Kaplan | ................ | A61K 9/0019 424/499 |
| 2015/0182461 A1 * | 7/2015 | Kim | ..................... | A61K 9/5153 514/772.3 |
| 2015/0250926 A1 * | 9/2015 | McClain | ................ | A61L 29/085 604/509 |

OTHER PUBLICATIONS

Acharya et al., "The hydrogel template method for fabrication of homogeneous nano/microparticles", Journal of Controlled Release, 2010, vol. 141, pp. 314-319.

Champion et al., "Particle shape: A new design parameter for micro- and nanoscale drug delivery carriers", Journal of Controlled Release, 2007, vol. 121, pp. 3-9.

(56) References Cited

OTHER PUBLICATIONS

Choi et al., "In Situ Microfluidic Synthesis of Monodisperse PEG Microspheres", Macromolecular Research, 2009, vol. 17, No. 3, pp. 163-167.

Dendukuri et al., "Controlled Synthesis of Nonspherical Microparticles Using Microfluidics", Langmuir, 2005, vol. 21, pp. 2113-2116.

Guan et al., "Fabrication of polymeric microparticles for drug delivery by soft lithography", Biomaterials, 2006, vol. 27, pp. 4034-4041.

Guan et al., "Fabrication of Particulate Reservoir—Containing, Capsulelike, and Self-Folding Polymer Microstructures for Drug Delivery", Small, 2007, vol. 3, No. 3, pp. 412-418.

Lee et al., "Dissolving microneedles for transdermal drug delivery", Biomaterials, 2008, vol. 29, pp. 2113-2124.

Nichol et al., "Modular tissue engineering: engineering biological tissue from the bottom up", Soft Matter, 2009, vol. 5, pp. 1312-1319.

Park et al., "Polymer particle-based micromolding to fabricate novel microstructures", Biomed Microdevices, 2007, vol. 9, pp. 223-234.

Park et al., "Biodegradable polymer microneedles: Fabrication, mechanics and transdermal drug delivery", Journal of Controlled Release, 2005, vol. 104, pp. 51-66.

Rolland et al., "Direct Fabrication and Harvesting of Monodisperse, Shape-Specific Nanobiomaterials", Journal of American Chemical Society, 2005, vol. 127, pp. 10096-10100.

Yin et al., "Self-Assembly of Monodispersed Spherical Colloids into Complex Aggregates with Well-Defined Sizes, Shapes, and Structures", Advanced Materials, 2001, vol. 13, No. 4, pp. 267-271.

PCT International Search Report and the Written Opinion, Application No. PCT/IB2014/060530 filed Apr. 8, 2014, dated Jun. 27, 2014.

* cited by examiner

METHOD FOR PRODUCING SHAPED POLYMERIC MICROPARTICLES

This is a national stage application filed under 35 U.S.C. § 371 of international application PCT/IB2014/060530, filed under the authority of the Patent Cooperation Treaty on Apr. 8, 2014, published; which claims the benefit of Patent Application No. TO2013A000284, filed on Apr. 9, 2013. The entire disclosures of all the aforementioned applications are expressly incorporated herein by reference for all purposes.

The present invention relates to a method for preparing shaped polymeric microparticles.

The term "shaped" is used in the present description to denote particles having a shape other than the spherical or substantially spherical shape which is the thermodynamically favourable shape and which can therefore be produced easily in various sizes, with various polymers, in batch processes.

In particular, the invention relates to the production of engineered shaped microparticles. The term "engineered" is intended to denote particles having a suitable microstructure and formulation, for example microparticles with controlled porosity, or polymeric microparticles loaded in advance with bioactive molecules.

In recent decades, there has been a growing interest in the production of shaped polymeric micro-particles for various applications, ranging from tissue engineering (Soft Matter, 2009, 5, 1312-1319) to microreservoirs for drug delivery, such as micro- and nano-vehicles to be introduced into the body (Macromolecular Research, vol. 17, no. 3, pp. 163-167 (2009); Small 2007, 3, no. 3, 412-418, Journal of Controlled Release 104 (2005) 51-66; Biomaterials 29 (2008) 2113-2124; Biomed Microdevices (2007) 9:223-234).

In particular, in the field of tissue engineering where anisotropic properties are highly desirable, attention has been focused recently on polymeric microparticles having shapes other than spherical. Shapes other than spherical may also be used in photonics and as probes for rheological analysis (Langmuir 2005, 21, 2113-2116). Other possible applications relate to advanced forms of drug delivery, forms of controlled drug release and applications in the field of targeting and recognition (Biomaterials 27 (2006) 4034-4041).

For these purposes, the morphology of the particle (that is to say, the shape and size) must be engineered according to the function of the particulate agent (J. Am. Chem. Soc. 2005, 127, 10096-10100).

By contrast with the production of the thermodynamically favourable spherical shape, which is easily obtainable, other shapes require more sophisticated procedures for their production and consolidation. Three main methods of producing shaped microparticles are known from the literature.

A first approach is that of microfluidics (Langmuir 2005, 21, 2113-2116), in which polymer droplets, formed by subjecting a polymer to a shear force in a continuous aqueous phase in a T-junction, are constrained to assume non-spherical shapes by confinement, using appropriate microchannel geometries.

Although this method enables precise shapes to be produced, it is subject to limitations in respect of the limited number of shapes that can be produced (mainly cylinders or parallelepipeds and small discs), the limited number of polymers that can be used, and the limited production rate, given that the microparticles are produced one at a time.

Another approach is based on a moulding method, in which the shape is defined by the cavity of the mould. In this case, the main problem is the presence of a continuous layer connecting the microparticles which therefore remain connected to each other.

This problem can be tackled by using special moulds made of PFPE, or, more advantageously, by using surface treated PDMS as the mould material, but the optimization of the process in order to vary the type of polymer and the shape may still be costly in terms of time.

Furthermore, with these methods it would be difficult or even impossible to produce specific thicknesses (of more than a few µm) for some polymers. Finally, the larger the operating area, the more difficult it becomes to avoid the presence of the continuous layer. In any case, even if this layer is avoided, the aforesaid known methods cannot always be used to form a suitable microstructure.

WO2008/031035 describes a further procedure in which polymeric microspheres are incorporated into a polymer matrix and subjected to stretching. The initial particles are heated above their glass transition temperature or subjected to plasticization by means of solvent. Theoretically, this method could conserve the microstructure and/or preserve any active agents with suitable arrangements. However, the method is still dependent on the material used and is limited in terms of the shapes that can be obtained, as well as being costly in terms of time.

The main object of the present invention is to provide a method for producing shaped polymeric microparticles which is versatile in terms of the materials that can be used and shapes that can be obtained, while being inexpensive.

Another object of the invention is to provide a method that can be used to produce engineered particles which have specific properties or which maintain engineered properties of spherical particles.

In view of these objects, the invention proposes a method as defined in the claims below, which form an integral part of the present description.

The method according to the invention provides for the use of pre-formed spherical microparticles as the initial material. In the most advantageous embodiment, use is made of pre-formed spherical particles that are engineered; that is to say, they have a microstructure, for example porosity or loading with active principles, which substantially corresponds to the microstructure which is to be obtained for the shaped microparticles forming the desired end product.

The initial spherical microparticles, which may or may not be engineered, may be produced by a variety of known methods, for example spray drying, interface polymerization, hot-melt encapsulation, emulsion, microencapsulation with solvent evaporation, coacervation, microfluidics, preferably using a porous membrane, and the like.

Microparticles produced in this way are transformed into the desired non-spherical shape, using an appropriate mould which has microcavities (not interconnected) having the desired shape, generally arranged in an array or matrix.

Preferably, each spherical microparticle is positioned in a respective micro-cavity of the mould and is then subjected to softening by exposure to a solvent adapted to plasticize the polymeric material, or to a mixture of solvent and non-solvent, in the liquid state or, preferably, in the vapour state. Alternatively, the softening may be assisted by heating, if necessary, to a temperature preferably below 60° C. and even more preferably below 40° C. Alternatively, in cases which are less critical for the conservation of the microstructure, and/or for more heat-resistant active principles, the softening may be provided by heat treatment, by heating to a temperature within the softening range of the polymer used, which is generally between the glass transition temperature and the melting point (for crystalline polymers), preferably not exceeding 40% above the glass transition temperature and preferably not exceeding 50° C.

The method reliably prevents the formation of a continuous layer (scum layer) which interconnects the microstructures, and is applicable to any type of polymer that is subject to softening, of any size, from sub-micrometric to sub-millimetric. It makes it possible to deform spherical microparticles having a size from a few microns to hundreds of microns in diameter, preferably from 2 µm to 600 µm, more preferably from 10 µm to 300 µm, the minimum size being determined by the capacity for automatic handling of the microparticles, and the maximum size being determined by the kinetics of plasticization. In the case of a cavity with a structured base, a further surface topography of the shaped microparticle can be obtained, and can also be submicrometric, down to a few tens of nanometers.

In particular, solvent-assisted forming in the mould cavity makes it possible to operate at ambient temperature, thus avoiding the degradation of active agents such as drugs or biomolecules incorporated in the pre-formed spherical microparticles, while also avoiding the degradation of the microstructure.

For example, if it is desired to maintain a specific porous microstructure providing a given release profile of active agents incorporated in the microparticle, the use of solvent treatment in the vapour phase at ambient temperature is highly preferable.

The use of microparticles loaded with various drugs or biomolecules can also be envisaged. For example, in the case of microneedles, microparticles loaded with various drugs can be used simultaneously in different cavities, for the production of an array of shaped microparticles suitable for multiple drug release.

The shaped microparticles are consolidated by evaporation of the solvent, or by cooling, in cases where forming is assisted by a temperature increase.

In a preferred embodiment, before consolidation, the microparticles in the softened state are subjected to a small degree of pressure, applied for example by means of a counter-mould such as a glass panel which is placed in contact with the microparticles within the mould cavity, in order to improve their forming in terms of faithfulness to the geometry of the cavity (for example, in order to obtain sharp edges, in the case of prismatic shapes).

Evidently, the material used for the mould cavity must be less adhesive than the material of the counter-mould; for example, a PDMS mould may be used with a glass counter-mould.

Naturally, the method may be used to obtain a wide variety of non-spherical shapes, such as discs, ellipsoids, bars and prismatic shapes, of various kinds. The method is applicable to any thermoplastic polymer, to be chosen according to the type of application from a wide variety of polymers, in combination with an appropriate choice of solvent or solvent/non-solvent system.

In the case of bioapplications, preferred polymers are, for example, PLA, PLGA, PCL, gelatine, and any biodegradable or biocompatible thermoplastic polymer.

As mentioned above, the initial spherical microparticles may contain a wide variety of additives such as functional active agents, drugs, active biomolecules, or ligands which facilitate the targeting of the microparticles on a specific site in vivo.

In the appended drawings.

Figure 1:
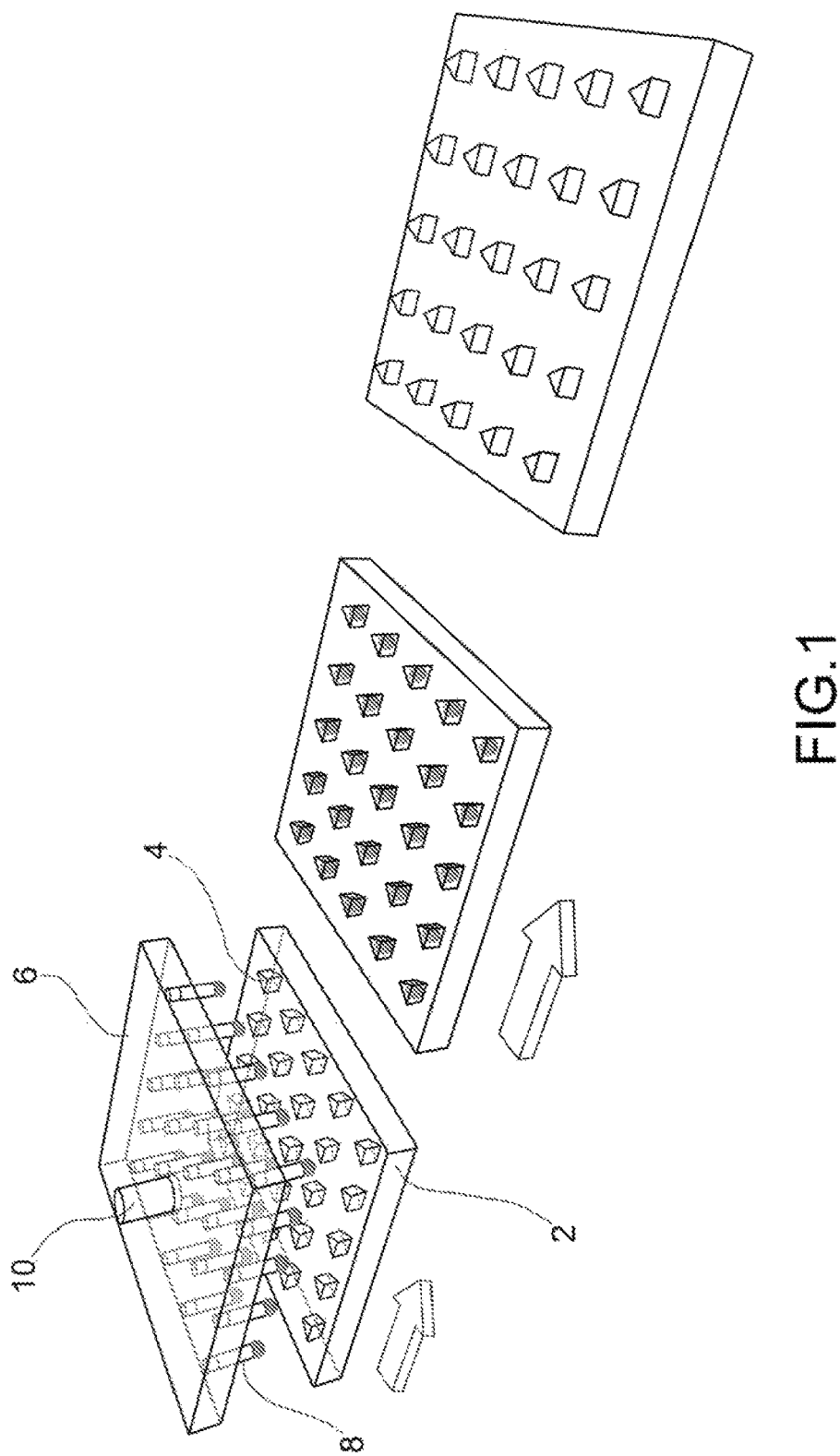
FIG. 1 is a schematic illustration of the mould apparatus used in the method according to the invention.
Figure 2:
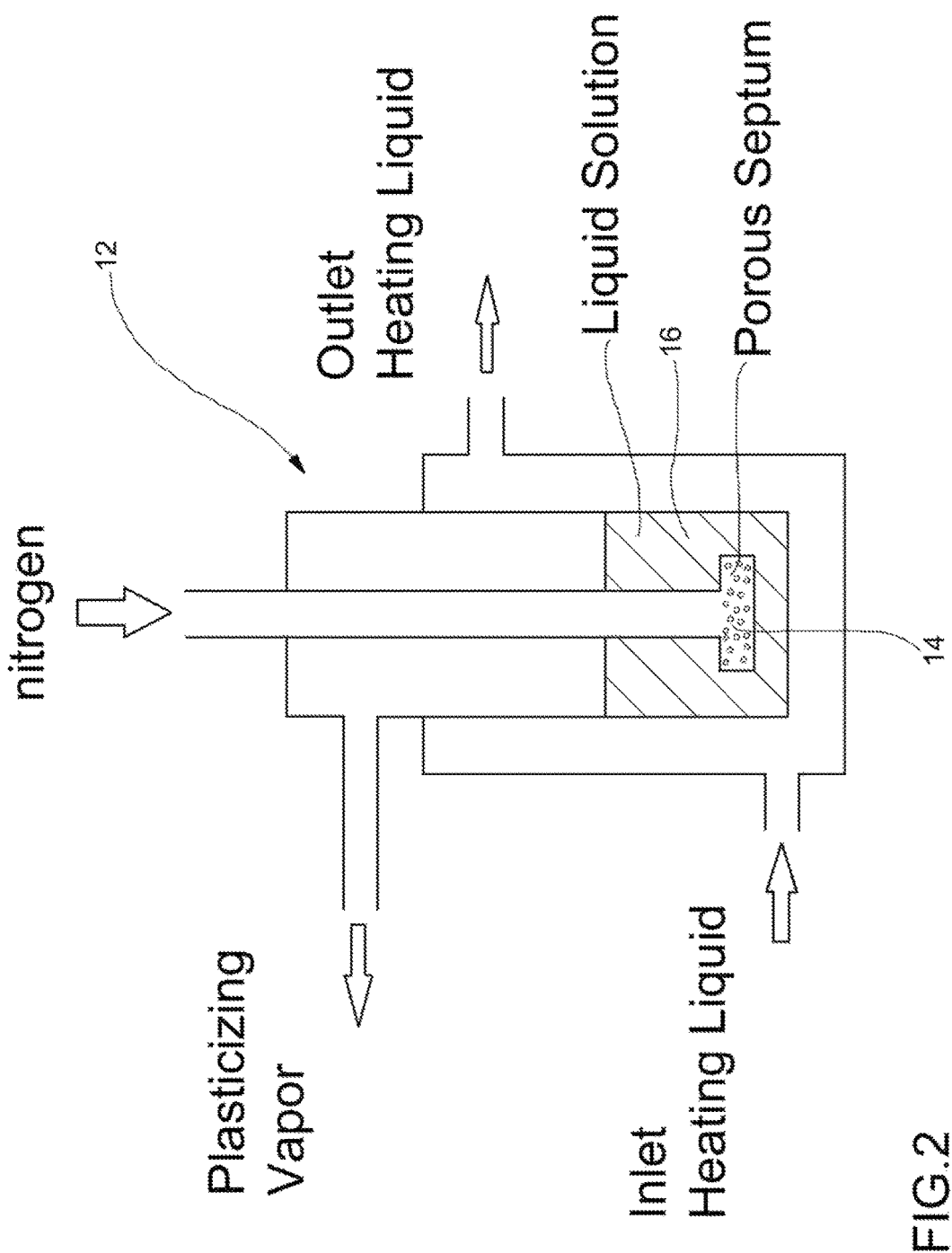
FIG. 2 is a schematic illustration of a vaporizing device.

For the application of the method according to the invention, an apparatus of the type shown schematically in FIGS. 1 and 2 was used.

This apparatus comprises a mould 2, having a plurality of mould microcavities 4. The mould may be made of various materials and may be produced by various suitable methods such as lithography, RIE or other technologies. In the tests that were conducted, a mould made of PDMS was used, produced in two stages using the replica moulding technique.

Initially, a reverse mould was produced with structures in relief, having the shape of the mould cavities to be provided, for example prismatic shapes with cross-shaped, triangular, rectangular bases, or cylindrical disc shapes.

The reverse mould was produced using a silicon substrate with microstructures of SU8, formed by means of a 2D laser system. The relief structures had a volume of about $4.2 \times 10^6$ $\mu m^3$, corresponding to the volume of the microparticles to be produced.

For the production of the mould, PDMS in the liquid state (Sylgard 184®), previously mixed with a cross-linking agent in proportions by weight of 1:10, was poured on to the silicon/SU8 substrate and cured in an oven at 80° C. for 2 hours. The hardened PDMS mould was then easily separated from the reverse mould made of PMMA.

To enable an automated process to be provided, the apparatus used also comprises a micromanipulator 6 adapted to pick up a plurality of microspheres simultaneously and enable them to be deposited in the mould cavities 4.

By way of example, the micromanipulator device comprises a body defiling a suction chamber within it and having a lower wall with a plurality of holes communicating with said suction chamber and arranged in a matrix with an interval corresponding to the intervals of the mould cavities 4 formed in the mould.

A thin rigid tube or suction needle 8, the passage of which has a smaller diameter than that of the microspheres to be picked up and deposited, is connected to each hole. The upper wall of the body of the micromanipulator has a single hole to which is connected in a sealed way a manifold 10, formed by a thin tube or needle, which in turn can be connected to a vacuum pump.

When the vacuum pump has been started, the micromanipulator can be used to pick up a plurality of microspheres and enable them to be deposited in the mould cavities, after the vacuum pump has been stopped.

In order to avoid phenomena of aggregation of the microparticles due to electrostatic interactions that may occur, depending on the plastic material from which the particles are made, and in order to ensure that a single microsphere is retained at each suction hole, a small flow of air can be used, or a brushing operation can be carried out before the vacuum pump is stopped.

The same micromanipulator can be used to supply vapours of the solvent and plasticizer mixture, using a carrier gas such as nitrogen if necessary, in a localized manner on the microspheres or in the vicinity of the microspheres positioned in each mould cavity.

In order to generate a flow of solvent vapour, a conventional bubble vaporization apparatus 12 may be used, with a heating jacket 18, of the type shown schematically in FIG. 2. In this apparatus 12, a carrier, for example nitrogen, is fed to a porous partition 14 immersed in the liquid solvent solution 16. The solvent vapour that is generated may, as mentioned, be fed to the micromanipulator.

EXAMPLE 1—MICROSPHERES OF D,L-LACTIC-CO-GLYCOLIC ACID (PLGA) SOFTENED WITH A MIXTURE OF DIMETHYL CARBONATE (DMC) AND ETHANOL IN THE VAPOUR STATE

PLGA is known to be a polymer that is rapidly dissolved in DMC. On the other hand, ethanol does not dissolve PLGA.

Microspheres of PLGA (Resomer 504H®) with a volume of $4.2 \times 10^6$ µm$^3$ were produced in advance by means of a suitable membrane system with a degree of porosity comparable to that of the spherical microparticles to be produced (Micropore® System).

Each microsphere was placed in a respective PDMS mould cavity (that is to say, one microsphere in one cavity), using the micromanipulator 6, as shown in FIG. 1. The mould was then positioned on a flat support with its flat lower wall facing the flat surface of the support.

A liquid solution of DMC and ethanol (DMC:EtOH, 2:1, v:v) was then vaporized, using a vaporization apparatus as described above, on to the microspheres placed in the cavities. After two minutes of vapour flow, a glass slide was placed in contact with the plasticized microspheres to improve the forming and for the purpose of removing the shaped microspheres from the mould.

The method was carried out at ambient temperature (about 25° C.) and ambient pressure.

Figure 3A:
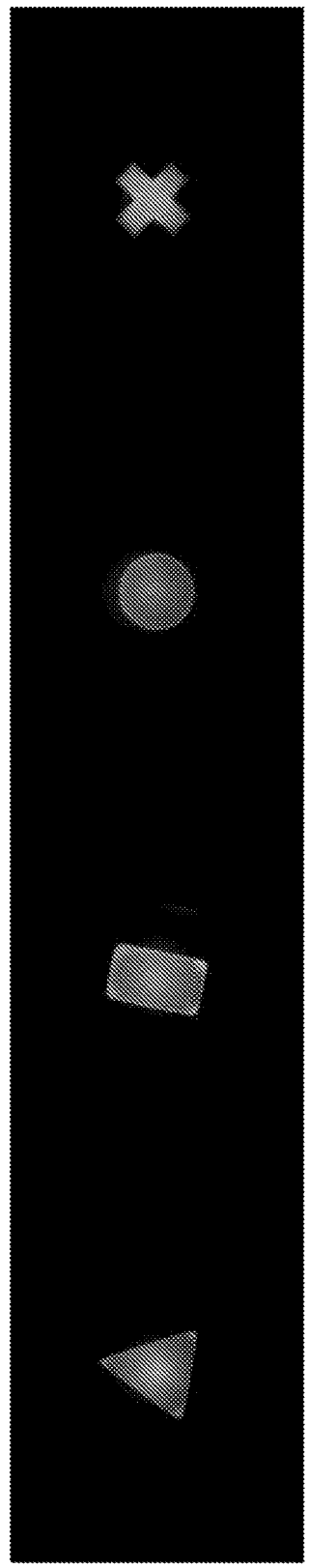
FIGS. 3a and 3b are photographs illustrating microparticles produced by the method of Example 1.
Figure 3B:
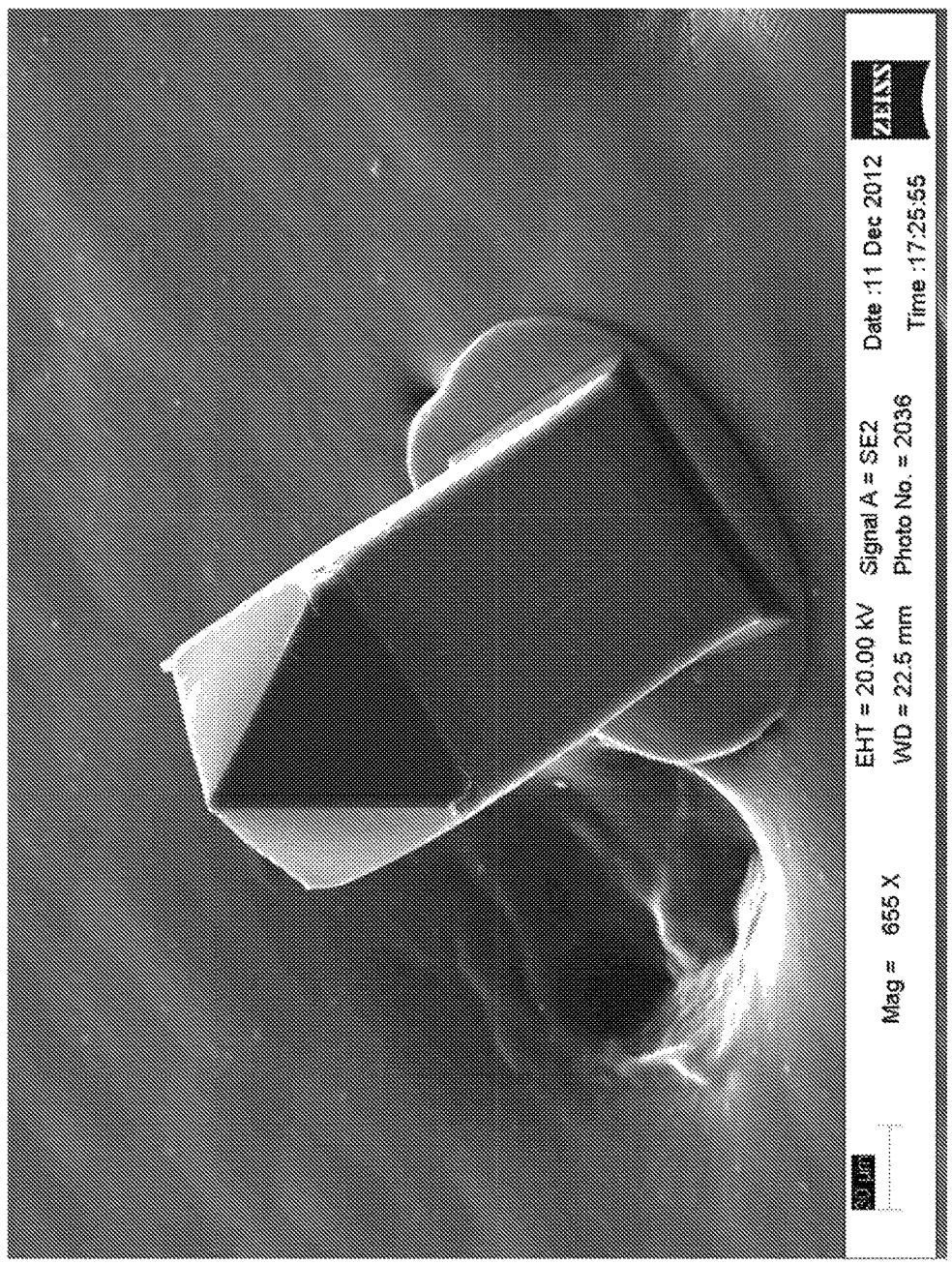

FIGS. 3a and 3b show some of the microparticles obtained by using moulds with cavities of different shapes.

The method described above was repeated using microspheres having a porous internal structure.

Figure 4A:
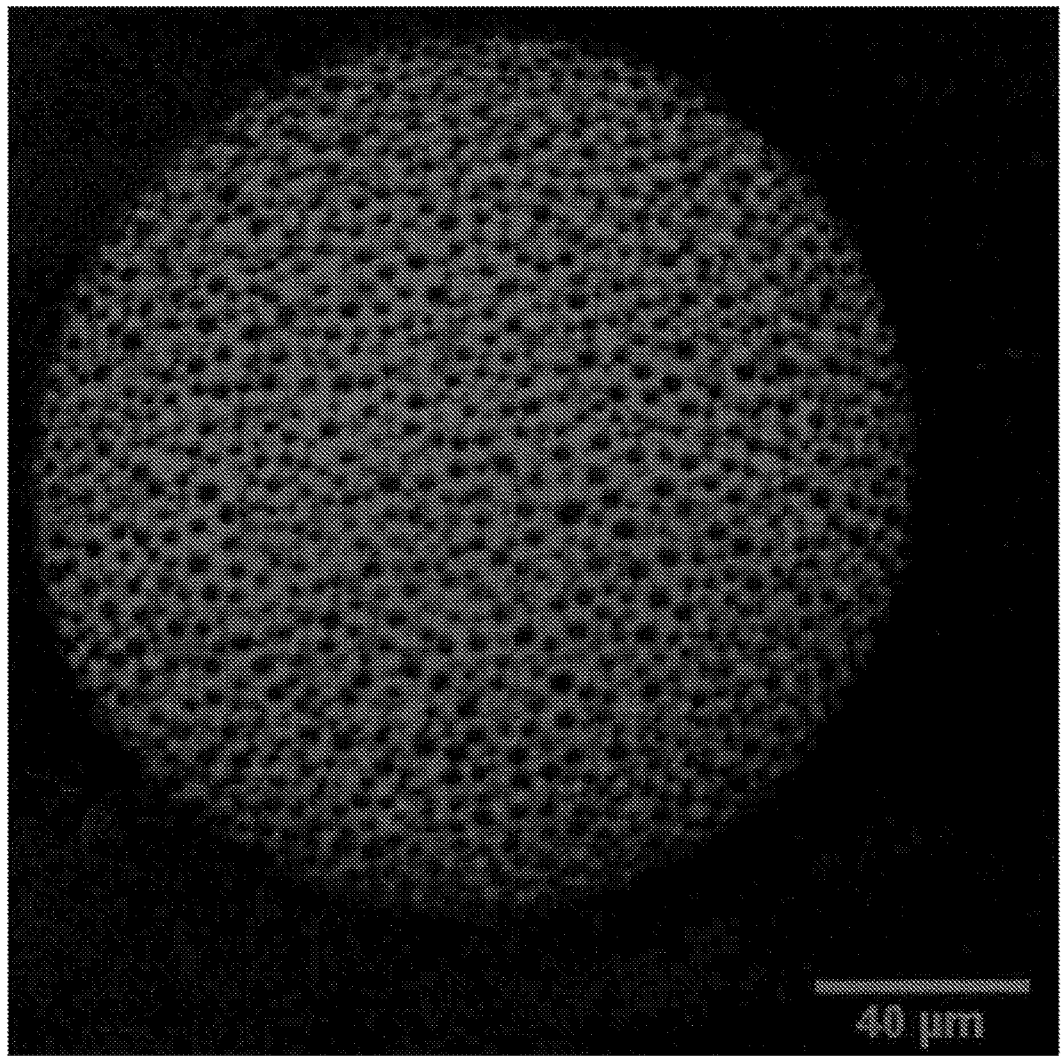
FIGS. 4a and 4b show confocal microscope images of porous microparticles, before and after the forming process respectively.
Figure 4B:
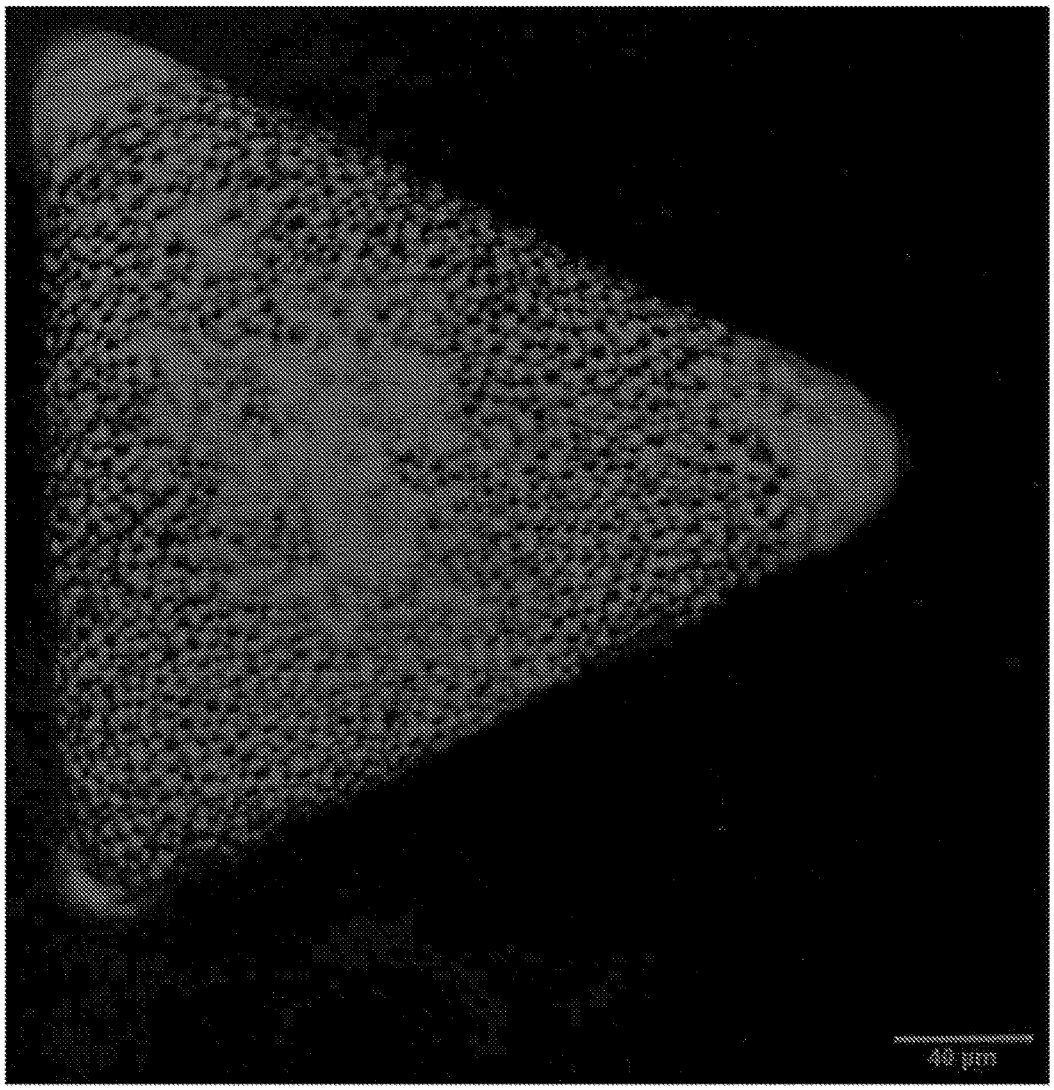

FIGS. 4a and 4b are confocal microscope images which show how the porosity is maintained after forming, by using porous microparticles loaded with a chromophore.

EXAMPLE 2—MICROSPHERES OF POLYMERIC GELATINE PLASTICIZED WITH WATER IN THE LIQUID STATE

MICROSPHERES OF GELATINE POLYMER WITH A VOLUME OF $65.5 \times 10^6$ µM$^3$, SOLUBLE IN WATER, WERE prepared by the known single emulsion method.

The procedure described in Example 1 was repeated, but the microspheres were softened by using water as the solvent in the liquid state. The water, at a temperature below 50° C., was injected through a syringe and allowed to evaporate partially. After 15 minutes in this condition, a glass slide was placed in contact with all the plasticized microspheres, to improve the shaping and for the purpose of removing the microspheres from the mould.

Figure 5:
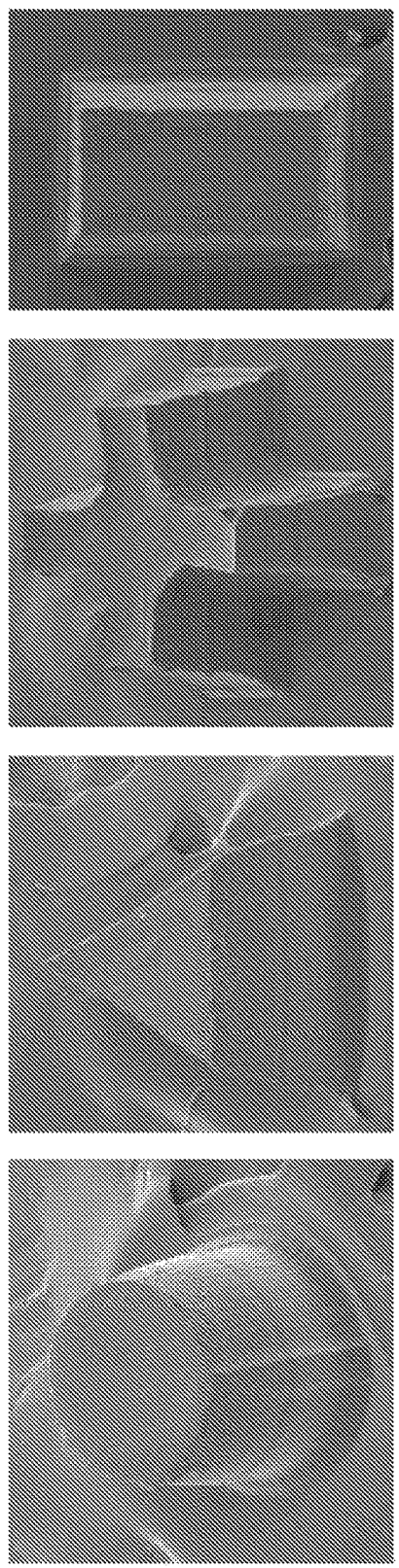
FIG. 5 is a photograph produced by a scanning electron microscope showing shaped microspheres produced in Example 2.

FIG. 5 shows shaped microspheres produced according to this example with various geometries. The high degree of faithfulness of the geometry of the shaped microparticles to the geometry of the mould cavity should be noted. Additionally, the shaped microparticles are separated from each other; that is to say, they are not interconnected.

The invention claimed is:

1. Method for producing non-spherical polymeric microparticles having a microporous structure, comprising the steps of:
   providing a plurality of polymeric microparticles, each microparticle having a microporous structure and having a substantially spherical shape filled with a drug or a biomolecule;
   placing each microparticle in a respective micro-cavity of a mould comprised of multiple non-spherical shaped micro-cavities;
   softening each microparticle by exposure to a solvent or mixture of solvent and non-solvent, in a vapour state at a temperature below 60° C. or exclusively by heat treatment at a temperature not exceeding 40% above the glass transition temperature thereby plasticizing the polymeric material constituting said microparticle;
   consolidating the thus obtained plasticized microparticle, and
   removing each plasticized non-spherical microparticle from the respective mould micro-cavity, wherein the said plasticized non-spherical microparticle has maintained said microporous structure;
   whereby degradation of said drug or biomolecule in said plasticized non-spherical microparticle is avoided.

2. Method according to claim 1, comprising the step of subjecting said microparticles to a pressure in the respective mould micro-cavities prior to removal from said mould micro-cavity.

3. Method according to claim 1, characterized in that the softening of the particles is caused by localized application in the mould micro-cavity of a solvent or a mixture of solvent and non-solvent in a vapour state, at a temperature below 40° C.

4. Method according to claim 1 for deforming microparticles having a size from 2 µm to 600 µm in diameter.

5. Method according to claim 1, wherein said microcavities have a base with a structured surface such that the shaped microparticles have a corresponding surface structure.

6. Method according to claim 1, wherein said shaped microparticles are formed by a biodegradable or biocompatible thermoplastic polymer.

7. Method according to claim 1, wherein said shaped microparticles comprise polylactic acid) (PLA), polylactic-co-glycolic acid) (PLGA), polycaprolactone (PCL) or gelatine.

* * * * *

UNITED STATES PATENT AND TRADEMARK OFFICE
CERTIFICATE OF CORRECTION

PATENT NO. : 10,384,372 B2
APPLICATION NO. : 14/782459
DATED : August 20, 2019
INVENTOR(S) : Raffaele Vecchione et al.

It is certified that error appears in the above-identified patent and that said Letters Patent is hereby corrected as shown below:

In the Claims

Column 6, Claim 7, Line 54, please correct from:
"polylactic acid) (PLA), polylactic-co-glycolic acid) (PLGA)"

To:
-- poly(lactic acid) (PLA), poly(lactic-co-glycolic acid) (PLGA) --.

Signed and Sealed this
Twenty-second Day of October, 2019

Andrei Iancu
*Director of the United States Patent and Trademark Office*